United States Patent [19]

Kudo et al.

[11] Patent Number: 4,497,870
[45] Date of Patent: Feb. 5, 1985

[54] MAGNETO-OPTICAL RECORDING MEDIUM

[75] Inventors: Yoshihiko Kudo, Moriguchi; Hidetsugu Kawabata; Masahiro Birukawa, both of Hirakata; Noriaki Hara, Kadoma; Akira Muto, Sakai, all of Japan

[73] Assignee: Matsushita Electric Industrial Co., Ltd., Kadoma, Japan

[21] Appl. No.: 482,709

[22] Filed: Apr. 6, 1983

[30] Foreign Application Priority Data

Apr. 7, 1982 [JP] Japan ................................. 57-58868

[51] Int. Cl.³ ............................................. H01F 10/02
[52] U.S. Cl. .................................... 428/457; 428/692; 428/900
[58] Field of Search ............... 428/694, 692, 900, 457; 427/127–132, 48

[56] References Cited

PUBLICATIONS

IEEE Transactions on Magnetics, vol. Mag-11, No. 5, Sep. 1975, pp. 1097–1102, Krumme et al., *Ferromagnetic Garnet Films for Magneto-optic Information Storage.*

Primary Examiner—Bernard D. Pianalto
Attorney, Agent, or Firm—Cushman, Darby & Cushman

[57] ABSTRACT

A magneto-optical recording medium comprising a layer of amorphous rare-earth-transition-metal alloy having a uniaxial magnetic anisotropy, the alloy containing germanium as additive, and the recording medium having high crystallization temperature, enough stability and good reading S/N ratio.

5 Claims, 3 Drawing Figures

MAGNETO-OPTICAL RECORDING MEDIUM

BACKGROUND OF THE INVENTION

1. Field of the Invention

The present invention relates to an improvement in a magneto-optical recording medium.

2. Description of the Prior Art

In general, a magneto-optical recording medium comprises a non-magnetic substrate, and the substrate holds thereon a layer of an amorphous rare-earth-transition-metal alloy. The layer has the uniaxial magnetic anisotropy perpendicular to a layer face thereof. The layer comprises two to three components, each belonging to transition metals or rare-earth metals.

In the above-mentioned magneto-optical recording medium, a recording operation and a reading operation are performed as follows. In an example case, an amorphous alloy layer is partially heated by a laser beam carefully focused thereon to raise the temperature of the amorphous layer over a compensation temperature of the amorphous layers or over the Curie temperature thereof, and at the same time, an external magnetic field is applied to the layer face perpendicularly thereto. Then, in a heated area, the desired magnetization perpendicular to the layer face is realized. In case a coercive force after cooling down the heated area is enough to stabilize an area which should be magnetically modified for recording operation, a diameter of a stable area can be formed as small as about 1 micron. Information values corresponding to logic numbers "1" or "0" are recorded by allocating them along a direction of magnetization in the layer area.

A reading operation is performed by applying a plane-polarized light beam to the layer area, so as to detect a magnetized direction of the layer area utilizing the Faraday effect or the Kerr effect.

But, the above-mentioned conventional magneto-optical recording medium has a shortcoming the Faraday effect or the Kerr effect is not enough to perform the reading operation, and structure of the amorphous substance is so much changed so as to make restoration to its former state difficult at a relatively low temperature, namely deteriorating the characteristics of the magneto-optical recording medium in the crystallization process. Attempts have been made to add boron to improve the crystallization process (i.e. for increasing the crystallization temperature), but an improvement upon the Faraday effect or the Kerr effect has not been realized. On the other hand, bismuth or tin has been added in an attemtp as to improve the Faraday effect or the Kerr effect, but an improvement upon the rise in the crystallization temperature has not been realized. Both the bismuth and the tin are low-melting point metals having the melting points lower than 300° C. When adding such metals, it is expected that the crystallization temperature rather drops. And further, in the case of making the alloy layer by a sputtering method, it is necessary to suppress the target temperature below the melting point of bismuth or tin, and therefore it is difficult to make the alloy layer with a single target electrode.

SUMMARY OF THE INVENTION

Therefore, the present invention purposes to solve the above-mentioned problem of conventional magneto-optical recording media and to provide a new magneto-optical recording medium having a high crystallization temperature, high stability and excellent S/N characteristics, accordingly, the medium being highly suitable for thermo-magnetic recording and magneto-optical reading.

DESCRIPTION OF THE PREFERRED EMBODIMENTS

A magneto-optical recording medium in accordance with the present invention comprises:

a layer of an amorphous rare-earth-transition-metal alloy having a uniaxial magneto anisotropy, the alloy containing germanium as an additive.

It is observed that as a result of the addition of germanium to the amorphous alloy of the rare-earth metal and the transition-metal, the crystallization temperature can be raised by about 100° C. as compared with amorphous alloys of the prior art, and the reading S/N ratio of the recording medium using the Kerr effect can be improved by about 40%. When the following general formula is satisfied, such type of alloy layer having the desired perpendicular magnetic anisotropy is obtainable.

$$(R_xM_{1-x})_{1-y}Ge_y \text{ where } 0.1<x<0.4, 0<y<0.2,$$

wherein R is at least one element of the rare-earth metals, M is at least one element of the transition metals and x and y are in the ranges of $0.1<x<0.4$ and $0<y<0.2$, respectively.

The present invention will now be described concerning an embodiment of the present invention with reference to the drawings.

Figure 1:
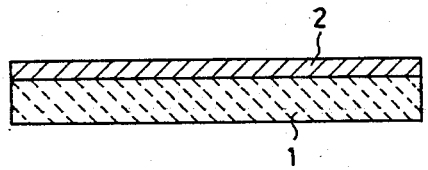
FIG. 1 is a sectional view of an embodiment of a magneto-optical recording medium in accordance with the present invention.

FIG. 1 is a sectional view of an embodiment of a magneto-optical recording medium in accordance with the present invention. In FIG. 1, reference 1 designates a glass substrate, and reference 2 designates an amorphous alloy layer consists of gadolinium, terbium, iron and germanium. The amorphous alloy layer 2 is made by utilizing a sputtering method. As aforementioned, melting point of bismuth or tin is lower than 300° C., and on the other hand melting point of germanium is about 960° C., and there is little difference between the melting point of germanium and that of iron, gadolimium, or terbium. Therefore, a single target of the composite a type comprising transition metal covered with rare-earth metal pieces and germanium pieces can be used as a target for sputtering. Accordingly, in the present case, the production efficiency is highly advanced in comparison with the conventional case which uses plural targets corresponding to respective substances. After evacuating the sputtering chamber to $1\times10^{-7}$ to $2\times10^{-7}$ Torr, sputtering is carried out on a glass substrate under an inner pressure of the sputtering chamber of $4 \times 10^{-2}$ Torr with high purity argon introduced therein, to form an amorphous alloy layer of 200 Å to 1000 Å in thickness.

A component of the alloy layer of the example made in the above-mentioned steps is as follows:

$$(Gd_{0.13}Tb_{0.13}Fe_{0.74})_{1-y}Ge_y$$

wherein germanium content value y is $0 < y \leqq 0.15$.

Figure 2:
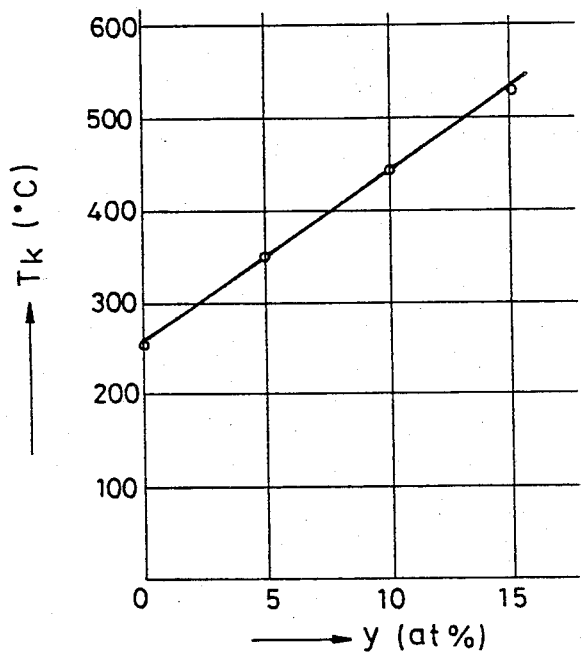
FIG. 2 is a graph of a characteristic curve showing a relationship between crystallization temperature $T_K$ of the Gd-Tb-Fe-Ge amorphous metal and the content of germanium therein in an embodiment of a magneto-optical recording medium in accordance with the present invention.

FIG. 2 is a graph of a characteristic curve showing a relationship between crystallization temperature of Gd-Tb-Fe-Ge amorphous metal and the content of germanium, in an embodiment of a magneto-optical recording medium in accordance with the present invention. In the graph, the ordinate is graduated by the crystallization temperature Tk(° C.), and the abscissa is graduated by the content of germanium y of the composition $$(Gd_{0.13}Tb_{0.13}Fe_{0.74})_{1-y}Ge_y.$$

Referring to FIG. 2, it is recognized that the crystallization temperature rises, and hence the stability against the temperature change of the alloy layer as a recording medium is improved as the content of germanium increases.

Figure 3:
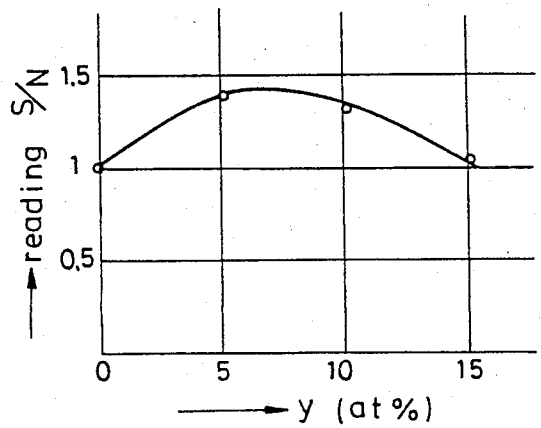
FIG. 3 is a graph of a characteristic curve showing the S/N ratio expressed in arbitrary units in the reading operation exhibited by a recording medium consisting of Gd-Tb-Fe-Ge amorphous alloy layer in accordance with the present invention.

FIG. 3 is a graph of a characteristic curve showing the relationship between the content value y and the S/N ratio during a reading operation utilizing the Kerr effect of the recording medium of a Gd-Tb-Fe-Ge amorphous alloy layer embodying the present invention. In the graph, the ordinate is graduated by the reading S/N ratio, and the abscissa is graduated by the germanium content value y, of the composition $(Gd_{0.13}Tb_{0.13}Fe_{0.74})_{1-y}Ge_y.$ Referring to FIG. 3, the reading S/N ratio is improved by about 40% at the maximum value by the addition of germanium.

As mentioned above, by inducing germanium in the recording medium comprising an amorphous rare-earth-transition-metal alloy having uniaxial anisotropy, it is possible to provide an improved magneto-optical recording medium which has a high crystallization temperature, high stability and excellent S/N characteristics, accordingly, suitable for purposes of thermomagnetic recording and magneto-optical reading.

What is claimed is:

1. A magneto-optical recording medium comprising a magneto-optical recording medium having a high crystallization temperature, high stability and excellent signal-to-noise characteristics suitable for thermo-magnetic recording and magneto-optical reading, said recording medium comprising a non-magnetic substrate having thereon at least one layer of an amorphous rare-earth-3d-transition-metal alloy having a uniaxial magnetic anisotrophy, wherein said alloy has a composition expressed by the general formula:

$$(R_xM_{1-x})_{1-y}Ge_y$$

wherein R is at least one rare-earth metal, M is at least one 3d transition metal, and X and Y are in the ranges of $0.1 < x < 0.4$ and $0 < y < 0.2$, respectively.

2. The magneto-optical recording medium of claim 1 in which the value of y is $0 < y < 0.15$.

3. The magneto-optical recording medium comprising a magneto-optical recording medium having a high crystalline temperature, high stability and excellent signal-to-noise characteristics suitable for thermo-magnetic recording and magneto-optical reading, said recording medium comprising a non-magnetic substrate having thereon at least one layer of an amorphous rare-earth-3d-transition-metal alloy having a uniaxial magnetic anisotrophy in which said alloy is:

$$(Gd_{0.13}Tb_{0.13}Fe_{0.74})_{1-y}Ge_y$$

and y has the value $0 < y \leqq 0.15$.

4. A magneto-optical recording medium according to claim 3 in which said alloy has a crystallization temperature ($T_K$) at least about 350° C.

5. A magneto-optical recording medium according to claim 3 in which said alloy has a S/N ratio of between about 1 and 1.5 times a magneto-optical recording medium devoid of said alloy.

* * * * *